United States Patent Office 2,741,625
Patented Apr. 10, 1956

2,741,625

TERTIARY ALKYL DERIVATIVES OF N,N'-DIALKYL-1,4-BENZOQUINONE DIIMINE

Charles J. Pedersen, Salem, N. J., assignor to E. I. du Pont de Nemours and Company, Wilmington, Del., a corporation of Delaware No Drawing. Application December 30, 1953,
Serial No. 401,393

3 Claims. (Cl. 260—396)

This invention relates to substituted N,N'-dialkyl-1,4-benzoquinone diimines, and more particularly to tertiary alkyl and cycloalkyl derivatives more fully described herein and after. The products of the present invention are particularly useful as intermediates in preparing the corresponding N,N'-dioxides. The products are also useful as inhibitors for the thermal polymerization of ethylenically unsaturated compounds, such as styrene, and for the atmospheric oxidization of readily oxidized compounds, such as benzaldehyde.

It is an object of the present invention to provide new and useful compounds of the general type of N,N'-dialkyl-1,4-benzoquinone diimines. Another object is to prepare intermediates which may be readily transformed to the corresponding N,N'-dioxides. Other objects will appear as the description of the invention proceeds.

These and other objects are accomplished by benzoquinone diimines represented by the following general formula:

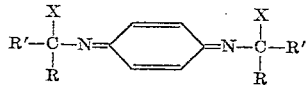

in which R and R' are the same or different lower alkyl radicals or together are polymethylene, forming a cycloaliphatic ring with the carbon attached to nitrogen as shown. In the formula, X is a functional potentially acid radical which is carboxyl or hydrolyzable to carboxyl, such as cyano —CN, carbamyl —CONH$_2$, lower carboalkoxy —COOR and carbonyl halides —COHal; and is joined to the carbons of the N,N'-substituted benzoquinone diimine as shown. It will be noted that this carbon is tertiary in nature. In the case of carboalkoxy derivatives the methyl, ethyl propyl and butyl esters are preferred. R and R' are attached to the same carbon atom and together contain not more than 8 carbon atoms.

The compounds of the invention may be prepared by oxidizing the corresponding N,N'-bis(alpha-substituted alkyl)-1,4-diaminobenzenes with diacylated hydrogen peroxides, such as benzoyl peroxide.

These precursors may be conveniently prepared by condensing para-phenylenediamine with hydrocyanic acid and an aliphatic or cycloaliphatic ketone. As an example, the diisobutyronitrile of Example I is made using acetone as the aliphatic ketone and in Example IV, cyclohexanone is used as the cycloaliphatic ketone. The corresponding carboxyl, carboalkoxyl, and carbamyl derivatives are made from the nitrile by well-known transformations. The steps may be outlined as follows:

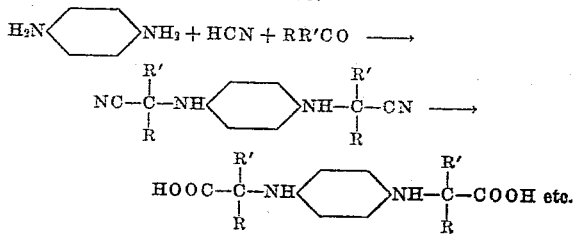

The oxidation reactions are preferably carried out in solution. The solvents should be neutral organic liquids which are not oxidized under reaction conditions. No limitation is otherwise placed on the solvent but typical examples are chloroform, carbon tetrachloride, acetone, aromatic hydrocarbons and the like. Dimethyl formamide has been found particularly suitable.

The temperatures of the reaction may vary considerably but temperatures between 0° C. and 30° C. are preferred. The following examples are given by way of illustration, but it is to be understood that the invention is not limited to the specific compounds and details given since the solvent, oxidizing agents, starting materials and proportions may vary considerably.

EXAMPLE I

N,N'-bis(alpha-cyanoisopropyl)-p-quinone diimine—C$_{14}$H$_{16}$N$_4$—Molecular weight 240

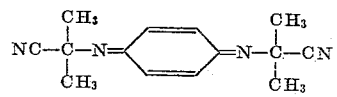

Two and four-tenths grams of alpha,alpha'-(p-phenylenediimino) diisobutyronitrile (C$_{14}$H$_{18}$N$_4$—0.01 mole) were dissolved in 50 cc. of acetone. Two and four-tenths grams of benzoyl peroxide (C$_{14}$H$_{10}$O$_4$—0.01 mole) were added to this solution and allowed to stand at room temperature for several hours. It was chromatographed twice on alumina and eluted with benzene. Seven-tenths gram of yellow crystals were recovered by evaporating the benzene solution under reduced pressure. The yellow crystals obtained by recrystallization from methanol had the following properties.

Melting point: 141° C.
Nitrogen content: Found 22.8%, required 23.3%
Maximum absorption in benzene:
2800A extinction coefficient 35,000
3700A extinction coefficient 580

EXAMPLE II

N,N'-bis(alpha-carboxyisopropyl)-p-quinone diimine,
diethyl ester—C$_{18}$H$_{26}$O$_4$N$_2$—Molecular weight 334

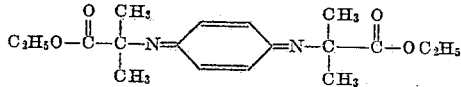

Three and three-tenths grams of alpha-alpha'(p-phenylenediimino)diisobutyric acid diethyl ester (C$_{18}$H$_{28}$O$_4$N$_2$—0.0098 mole) were dissolved in 25 cc. of dimethylformamide and stirred in an ice-bath to keep the temperature of the solution between 10 and 12° C. Two and a half grams of benzoyl peroxide (C$_{14}$H$_{10}$O$_4$—0.0103 mole) were added to it in small portions, and the agitation continued for 3 hours after all the peroxide had been added. The precipitate was filtered off, washed with dimethylformamide, benzene and petroleum ether, and dried at room temperature. One and one-tenth grams of yellow crystals were obtained.

Melting point: 125–126° C.
Nitrogen content: Found 8.5%, required 8.4%
Maximum absorption in methanol:
2870A extinction coefficient 32,000
3720A extinction coefficient 570

EXAMPLE III

N,N' - bis(alpha - carbamylisopropyl) - p - quinone diimine—C$_{14}$H$_{20}$O$_2$N$_4$—Molecular weight 276

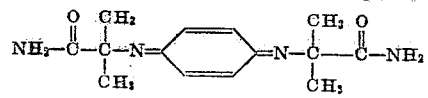

Five and a half grams of alpha,alpha'-(p-phenylene-diimino)diisobutyramide ($C_{14}H_{22}O_2N_4$—0.0198 mole) were dissolved in 200 cc. of dimethylformamide and stirred in a bath to maintain the temperature of the solution between 26 and 28° C. during the subsequent reaction. Five grams of benzoyl peroxide ($C_{14}H_{10}O_4$—0.0206 mole) were added in small portions to it and agitated for 5 hours after all the peroxide had been added. The mixture was filtered, the filter-cake washed with dimethylformamide, benzene and petroleum ether, and dried at room temperature. Four and eight-tenths grams of a yellow solid were recovered.

Melting point: Around 230° C. but indefinite
Nitrogen content: Found 20.1%, required 20.3%
Maximum absorption in methanol:
    2900A extinction coefficient 33,000
    3750A extinction coefficient 810

EXAMPLE IV

N,N' - bis(1 - cyanocyclohexyl) - p - quinone diimine—$C_{20}H_{24}N_4$—Molecular weight 320

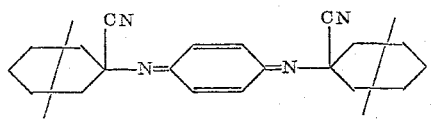

Thirty-two and two-tenths grams of 1,1'-(p-phenylene-diimino) - dicyclohexanecarbonitrile ($C_{20}H_{26}N_4$—0.1 mole) were dissolved in 880 cc. of chloroform. Twenty-four and two-tenths grams of benzoyl peroxide ($C_{14}H_{10}O_4$—0.1 mole) dissolved in 120 cc. of chloroform were added with agitation in 10 minutes, the temperature rising from 24 to 30° C. during this time. The mixture was stirred for 30 minutes more and extracted 3 times with 10% aqueous sodium carbonate to remove the benzoic acid. The solution was evaporated to dryness under reduced pressure after drying with anhydrous sodium sulfate. The residue was taken up in benzene, chromatographed on alumina and eluted with benzene. The yellow and orange portions were evaporated to give 10 grams of a yellow solid, which on recrystallization from 50 cc. benzene yielded 7.6 grams of yellow crystals.

Melting point: 195–200° C.
Nitrogen content: Found 17.2%, required 17.5%
Maximum absorption in methanol:
    2840A extinction coefficient 35,000
    3580A extinction coefficient 1,300
Maximum absorption in chloroform:
    2870A extinction coefficient 36,000
    3590A extinction coefficient 1,200

EXAMPLE V

N,N' - bis(1 - carbamylcyclohexyl) - p - quinone diimine—$C_{20}H_{28}O_2N_4$—Molecular weight 356

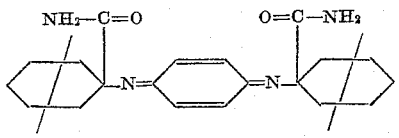

Seven and one-tenth grams of 1,1'-(p-phenylene-diimino) - dicyclohexanecarboxamide ($C_{20}H_{30}O_2N_4$—0.0198 mole) were dissolved in 100 cc. of dimethylformamide. Five grams of benzoyl peroxide ($C_{14}H_{10}O_4$—0.0206 mole) were added in small portions to this solution with agitation, the temperature being maintained at 25–30° C. The stirring was continued for 3 hours after all the peroxide had been added. The product was filtered off, washed with benzene and petroleum ether, and dried at room temperature. Six and one-tenth grams of yellow powder were obtained.

Melting point: 250° C. with decomposition
Nitrogen content: Found 15.8%, required 15.7%
Maximum absorption in dimethylformamide:
    3060A extinction coefficient 21,000
    3970A extinction coefficient 590

The compounds of the present invention have been found useful as inhibiting the thermal polymerization of styrene and the atmospheric oxidation of benzaldehyde. The following table illustrates the results obtained by the products of the examples on the polymerization of styrene and the oxidation of benzaldehyde. In determining the results of the table, 5 ml. samples of styrene containing the concentration of the inhibitor indicated were tightly stoppered in 20 ml. glass vials containing air, and heated at 88–96° C. for 6 hours in the dark. The polymer, if any, was then precipitated by pouring the sample into alcohol, dried and weighed. Where polymer was formed, its amount was expressed as a percentage of the amount formed in absence of any agent.

Samples of freshly distilled benzaldehyde, containing the concentrations of agents indicated, were exposed to air in open bottles in the dark for 73 hours at about 30° C. The extent of oxidation was then determined by titration with standard sodium hydroxide which neutralized the benzoic acid and other acidic oxidation products formed.

| Compound of Example No. | Effect on Polymerization of Styrene | | Effect on Oxidation of Benzaldehyde | |
|---|---|---|---|---|
| | Concentration, Moles/Liter | Polymer Formed, Percent of Control | Concentration, Percent by Weight | Acid, Percent of Control |
| I | 0.0001 | 19 | 0.3 | 0 |
| II | 0.0001 | 0 | 0.3 | 0 |
| III | 0.0001 | 12 | 0.3 | 0 |
| IV | 0.0001 | 0 | 0.3 | 0 |

It is apparent that many widely different embodiments of this invention may be made without departing from the spirit and scope thereof, and therefore, it is not intended to be limited except as indicated in the appended claims.

I claim:
1. A tertiary alkyl derivative of N,N'-dialkyl-1,4-benzoquinone diimine having the following formula

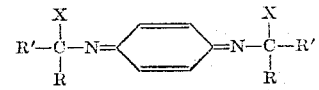

wherein R and R' are methyl; X is selected from the group consisting of the radicals carboxyl, cyano, carbamyl and carbonyl halide and carboethoxy; adjacent R and R' together are pentamethylene.

2. The process of preparing the compounds of claim 1 which comprises oxidizing the corresponding N,N'-bis-(alpha-substituted alkyl)1,4-diaminobenzene with benzoyl peroxide, at a temperature within the range of 0° C. to 30° C. in an inert liquid solvent, said alpha-substituted alkyl group being selected from the class consisting of methyl groups and pentamethylene.

3. The process of claim 2 in which the inert liquid solvent is dimethyl formamide.

References Cited in the file of this patent
UNITED STATES PATENTS 2,118,826    Semon            May 31, 1938
2,681,918    Pedersen          June 22, 1954